UNITED STATES PATENT OFFICE.

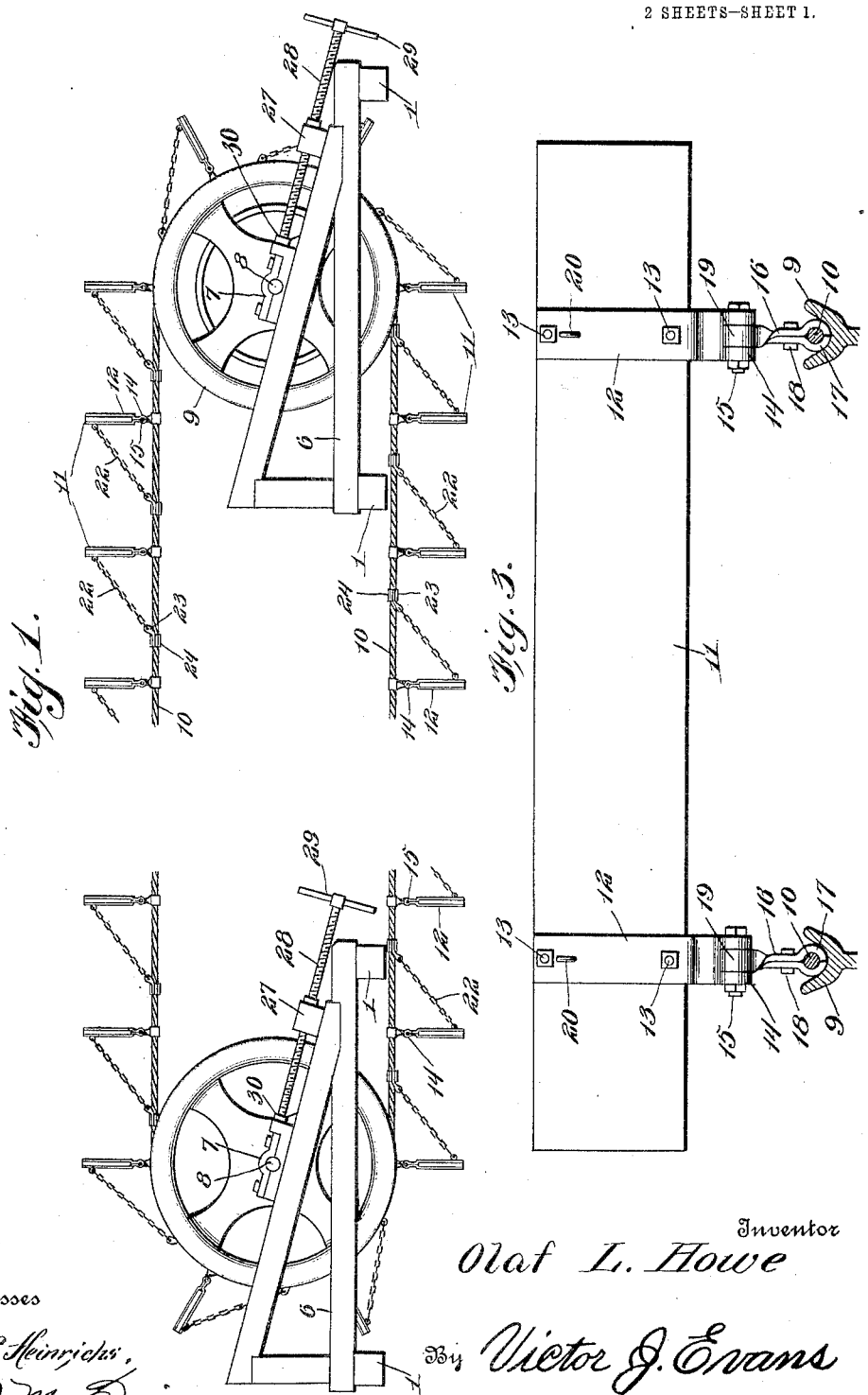

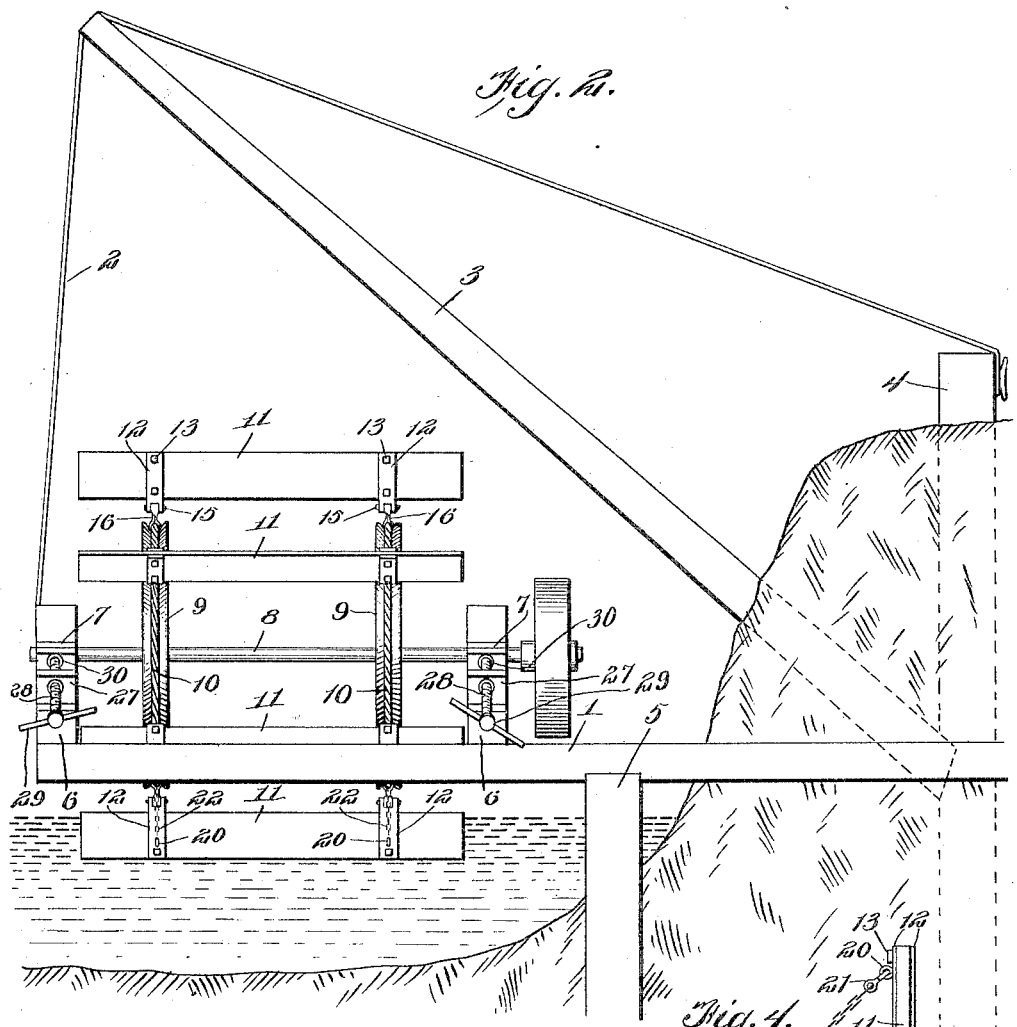

OLAF L. HOWE, OF MISSOULA, MONTANA.

CURRENT-MOTOR.

1,081,118.  Specification of Letters Patent.  Patented Dec. 9, 1913.

Application filed October 11, 1912. Serial No. 725,303.

*To all whom it may concern:*

Be it known that I, OLAF L. HOWE, a citizen of the United States, residing at Missoula, in the county of Missoula and State of Montana, have invented new and useful Improvements in Current-Motors, of which the following is a specification.

This invention relates to current motors, the object in view being to provide a simple, reliable and effective motor of the class described, which may be mounted in a stream adjacent to a convenient bank, and which embodies a novel arrangement of feathering blades, so mounted upon parallel endless cables that during the winter season the blades may be easily detached from the cables and stored away, and as easily reapplied to the cables after the termination of the winter season.

A further object of the invention is to provide means whereby the blades and their cables, together with the pulleys around which the cables travel, may be adjusted, so as to regulate the depth of penetration of the blades in the surface of the water, thereby obtaining the best effect from the current in which the blades operate.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a current motor, embodying the present invention. Fig. 2 is an end view of the same, showing the mounting of the working parts. Fig. 3 is a side elevation of one of the blades, showing the cables in cross section and the manner of connecting the blades to the cables. Fig. 4 is a detail section, showing the manner of mounting and bracing the blades on the cables. Fig. 5 is a detail perspective view of the stationary cable grip and hinge member. Fig. 6 is a similar view of the stay clip.

The current motor contemplated in this invention is mounted upon a plurality of parallel horizontal supporting beams 1, extending outwardly from the bank of a stream, as shown in Fig. 2, the said supporting beams being braced by means of cables 2 extending from the outer ends thereof upward over inclined masts 3 planted in the bank, and thence inward to suitable anchor posts 4, to which the cables are connected in any convenient manner. The beams 1 may be further supported from underneath by piles 5, as shown in Fig. 2.

6 designates cross beams connecting the supporting beams 1, and arranged in parallel relation to each other and at a suitable distance apart to permit the endless chain of paddles to work between them, as indicated in Fig. 2. These cross beams 6 are inclined, as shown in Fig. 1, and mounted so as to be capable of sliding thereon are bearings 7 which carry the shafts 8 of the pulleys 9, around which the parallel endless cables 10 run.

A pair of pulleys 9 is mounted on each shaft 8, and it may be stated that the shafts 8 may be located at any suitable distance apart in accordance with the length of the cables and the number of paddles used. These pulleys have their peripheries grooved, so as to securely retain the endless cables 10 therein.

In connection with the parallel cables 10, I employ a series of paddles or blades 11, each of which is preferably composed of wood, and each blade has secured thereto at the proper distance apart a pair of straps 12 which embrace the paddle or blade on opposite sides, as shown at Fig. 4, the opposite portions of the straps being secured thereto by bolts 13 or their equivalent. The strap extends beyond the inner edge of the blade or paddle, where it is formed into an eye or knuckle 14 which receives a hinge pin 15, whereby the paddle is pivotally connected to a combined cable grip and hinge member 16. This last-named member is also composed of a metal strap, bent to form an eye 7 to embrace tightly the adjacent cable 10, the end portions of the strap being brought together and fastened by means of bolts 18 or their equivalent, while the terminal portion of the strap is formed into an eye or knuckle 19 receiving the same hinge pin 15, above referred to. The construction described provides for fastening the paddles securely to the cables, and admits of their removal by simply taking out the hinge pins 15, which are preferably in the form of bolts, as shown.

Connected to each paddle or blade are eye bolts 20 adapted to receive snap hooks 21 on the outer ends of stays 22, in the form of chains, the opposite ends of which are secured to eyes 23 of clips 24, each of which is made up, as shown in Fig. 6, the same consisting of a metal strap bent to form an eye 25, which tightly embraces the cable 10 at a suitable distance from the blade or paddle, the side portions of the strap forming the clip being bolted or otherwise fastened together, as shown at 26, and extended to form the eye 23, to which the adjacent terminal link of the stay chain 22 is attached. The stay chains are of such a length as to sustain the blades or paddles substantially at right angles to the endless cables, by which they are carried, as shown in Fig. 4.

Mounted on each of the inclined cross beams 6 is a nut 27, through which passes a jack screw 28, having at its outer end a suitable operating handle 29. At its inner end, the jack screw has a swiveled connection, at 30, with the bearing 7, so that by turning the jack screw the bearing 7 may be slid up and down upon and lengthwise of the respective beam 6. This provides for adjusting the relative distance between the two shafts 8, and also adjusting said shafts 8 toward and away from the surface of the stream, over which the current motor is mounted, thereby enabling the depth of immersion of the blades or paddles to be regulated to obtain the best effect. This feature is also very valuable in streams which are influenced by the rise and fall of the tide.

What is claimed is:

In a current motor; the combination with a supporting structure; of parallel shafts; cable pulleys on said shafts; parallel endless cables passing around said pulleys; and a series of feathering blade units carried by said cables, each unit comprising a feathering blade, knuckles on the inner edge of said blade in line with said cables, combined cable grips and hinge members secured to and carried by said cables and each provided with a knuckle, each of said hinge members being formed of a metal strap folded upon itself, given a quarter twist, and bent to provide terminal eyes at right angles to each other, one of which forms the knuckle and the other the cable grip, detachable hinge pins passing through said knuckles parallel to the inner edge of said blade and connecting the knuckles of the blade to the knuckles of the cables, stay holding clips on said cables movable toward and away from said grip and hinge members and embodying clamping means permitting them to be adjusted lengthwise of said cables and fastened thereon, and flexible stays connecting the outer portion of said blade with said clips.

In testimony whereof I affix my signature in presence of two witnesses.

OLAF L. HOWE.

Witnesses:
L. C. PETTITT,
T. M. GIBSON.

---

Copies of this patent may be obtained for five cents each, by addressing the "Commissioner of Patents Washington, D. C."